A. J. LEWIS.
METHOD OF ASSEMBLING SPRINGS IN FASTENER MEMBERS.
APPLICATION FILED MAY 31, 1919.
1,357,175.
Patented Oct. 26, 1920.
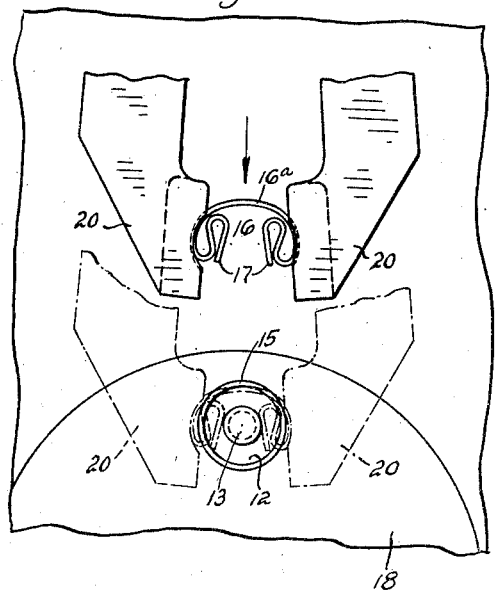
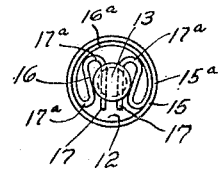
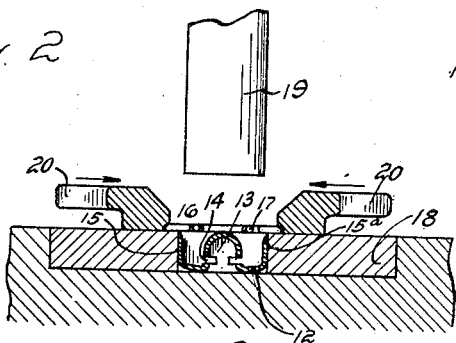
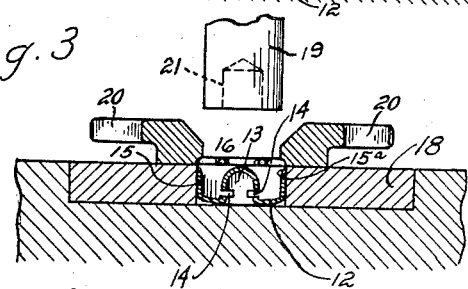
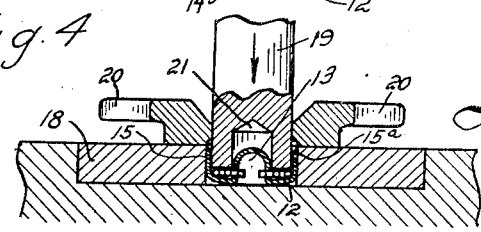
INVENTOR
Arthur J. Lewis
BY
A. M. Wooster
ATTORNEY

UNITED STATES PATENT OFFICE.

ARTHUR J. LEWIS, OF STRATFORD, CONNECTICUT.

METHOD OF ASSEMBLING SPRINGS IN FASTENER MEMBERS.

1,357,175.  Specification of Letters Patent.  Patented Oct. 26, 1920.

Application filed May 31, 1919. Serial No. 301,014.

*To all whom it may concern:*

Be it known that I, ARTHUR J. LEWIS, a citizen of the United States, residing at Stratford, county of Fairfield, State of Connecticut, have invented an Improvement in Methods of Assembling Springs in Fastener Members, of which the following is a specification.

This invention relates to the manufacture of the socket members of snap fasteners, so called, the socket members of which are provided with wire springs of peculiar formation which lock the shanks of the other fastener members in engagement with said socket members.

In Letters Patent No. 1,305,132 granted to me May 27, 1919, is disclosed an improved method of forming the wire springs employed in snap fastener socket members of the type above referred to, and for inserting said springs into said socket members, and the present invention relates particularly to improvements in the latter step of the process, namely that of assembling the springs in the fastener members, and to certain peculiarities in the preparation of the springs for this purpose.

The more particular objects of the invention will best be understood from the following explanation of one mode of carrying the same into effect, reference being had to the accompanying drawings in which:

Figure 1 is a diagrammatic plan view, and Figs. 2, 3, and 4 are sectional views, illustrating different steps in the process of inserting a spring into a fastener member.

Fig. 5 is an enlarged plan view of the complete fastener member.

While the method constituting the present invention may be employed in inserting springs into other small spring receiving articles, the same has more particular reference to the introduction of springs into snap fastener socket members of the type shown in Fig. 5. A socket member of this type comprises a sheet metal disk 12 having a central hollow stud 13 constituting the socket proper, and provided with diametrically opposite slots 14, said disk having an upwardly turned peripheral edge portion or flange 15 inclosing a wire spring 16, it being understood that, after the insertion of said spring, the edge 15 may be bent downwardly thereover to retain the same in place. The spring 16 is of a roughly semi-circular form, having an outer coil $16^a$ engaging the edge 15 of the fastener member, the ends of said coil being bent inwardly and outwardly upon themselves to form a series of convolutions $17^a$, and portions of the free terminals 17 thereof being, in the completed fastener, received laterally in the slots 14 of the central stud 13.

It will be understood that fastener members of the type above referred to are relatively small, so that the introduction of the springs thereunto, under proper tension, presents a manufacturing problem materially affecting the cost of such devices. In order to facilitate, as far as possible, the insertion of the springs 16 into the fastener members, it has heretofore been customary to form said springs with their outer coils $16^a$ of substantially the configuration of the peripheral edge portions 15 of the fastener members with which they are used, thereby limiting the effective resilience of the spring to the convolutions $17^a$ and terminals 17. By reason of the relatively small amount of material in these convolutions and terminals, they may very easily be so over-strained as to exceed their elastic limit, which results in a permanent set materially impairing the efficiency of the completed article.

In accordance with the present invention, the springs 16 are initially formed with outer coils $16^a$ somewhat flatter than the form assumed when the spring is in its final position in the fastener member, the spring, as a whole, being consequently of a slightly elliptical form with a major diameter somewhat exceeding the diameter of the fastener member into which it is to be inserted, as will be clear from a comparison of Figs. 1 and 5, so that the expanded spring must be compressed slightly when the same is inserted into the fastener (such compression, however, being insufficient to exceed the elastic limit of the spring), such spring being thereafter retained in the device under a permanent resilient compression which not only serves to resist accidental dislodgment of the spring from the fastener member, but increases the effective strength of the terminals 17, causing them to perform their intended function with increased reliability.

The initially expanded or over-size springs may, in accordance with the present invention, be inserted into the fastener members in the following manner: The fastener member 12 into which a spring is to be inserted is held in any suitable workholding device, as for example, a bed or carrier plate 18 having a recess to receive said fastener. A spring 16 in expanded condition is held between a pair of suitably formed plier or other jaws 20 (which jaws may be either mechanically or manually operated), as shown in Fig. 1, and said jaws moved in the direction of the arrow on Fig. 1 to bring said spring immediately over said fastener member, as shown in dotted lines in said figure. The jaws 20 may then be moved toward one another, as indicated by the arrows on Fig. 2, to compress the spring 16 into a sufficiently small compass to be received within the edge flanges 15 of the fastener member, as shown in Fig. 3. Thereafter, by the use of a suitable implement inserted between the jaws 20, the spring may be forced downwardly into the socket member, the terminals 17 thereof passing on opposite sides of the central stud 13 and eventually snapping into the slots 14 of the latter, and the outer coil 16ᵃ being seated at the base of the flange 15, the upper edges of the latter being preferably inwardly beveled, as shown at 15ᵃ, to facilitate such insertion of the spring. The operation last referred to may be conveniently performed by means of an implement 19 of an outside diameter corresponding to the inside diameter of the flange 15, and having in its end a socket 21 to receive the central stud 13, and an annular portion surrounding said socket, whereby when said implement is moved downwardly between the jaws 20, as indicated by the arrow in Fig. 4, the spring will be properly seated as above explained and as shown in Fig. 4.

It will be seen that, by the method above described, the insertion of small springs under initial tension into fastener socket members may be easily, cheaply, and rapidly accomplished without danger of injury to said springs.

Having thus described my invention, I claim:

1. The herein described method of inserting springs into spring receiving articles, which consists in holding an expanded spring immediately over the article to receive it between suitable jaws, contracting said jaws to compress said spring to within the compass of said article, and forcing said spring from said jaws into said article without permitting expansion thereof.

2. The herein described method of inserting springs into spring receiving articles having central studs, which consists in holding an expanded spring immediately over the article to receive it, compressing said spring to within the compass of said article, and forcing said spring while still held compressed into said article about the central stud thereof.

3. The herein described method of inserting springs into spring receiving articles having central studs, which consists in holding a spring under compression between suitable jaws immediately over the article to receive it and applying to said spring an annular implement to force the same from said jaws and about the stud of said article without permitting expansion thereof.

4. The herein described method of inserting springs into spring receiving articles having central studs, which consists in holding a spring under compression between suitable jaws immediately over the article to receive it, and applying to said spring an implement having a socket adapted to receive the central stud of said article and thereby force said spring from said jaws and about said stud without permitting expansion of said spring.

In testimony whereof I affix my signature.

ARTHUR J. LEWIS.